W. B. Wadsworth,
Windlass Water Elevator,
No. 3,056. Reissued July 28, 1868.
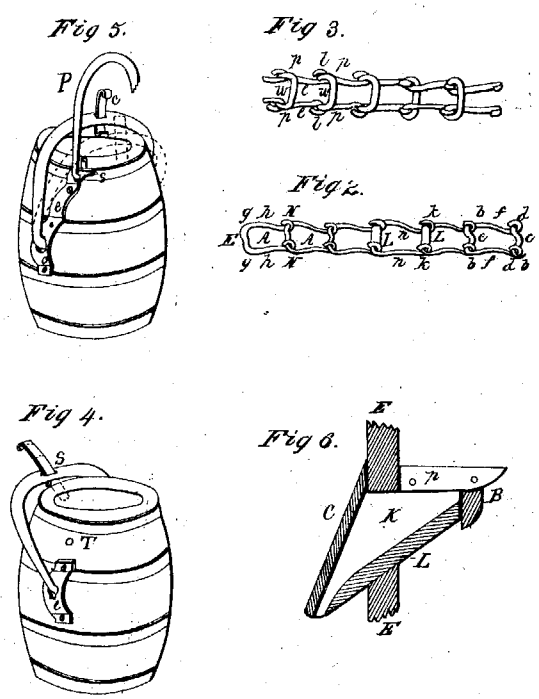
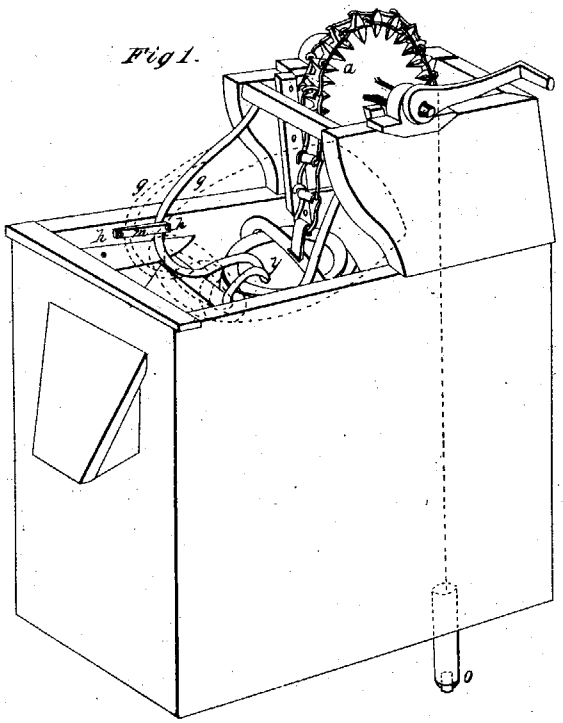
Witnesses.
P. J. Cobb
A. C. Cobb
Inventor.
W. B. Wadsworth
N. PETERS, PHOTO-LITHOGRAPHER, WASHINGTON, D. C.

UNITED STATES PATENT OFFICE.

W. B. WADSWORTH, OF CLEVELAND, OHIO.

IMPROVEMENT IN WATER-ELEVATORS.

Specification forming part of Letters Patent No. 37,535, dated January 27, 1863; Reissue No. 3,056, dated July 28, 1868.

*To all whom it may concern:*

Be it known that I, WM. B. WADSWORTH, of Cleveland, in Cuyahoga county, in State of Ohio, have invented a new and useful Improvement in Water-Elevators, for raising water from wells and cisterns, &c.; and I do hereby declare that the following is a full and exact description thereof, reference being had to the accompanying drawings, and letters of reference marked thereon, in which—

Figure 1 is a perspective view of the machine in operation. Figs. 2 and 3 show chains that are applicable. Fig. 4 shows a bucket with a stop to prevent it from tilting backward.

In constructing, I make a curb and mount it with a wheel and shaft, substantially as shown at *a*, Fig. 1, the teeth of the wheel being made slim and the bearings for the chain small, to attract but little water from the wet chain, and thus prevent obstruction with ice.

The chain is made of wire links, as shown at *c b b f f d d*, Fig. 2. The chain is put over the wheel, and a bucket on one end and counter-balance on the other. The bail is hinged near the center of the bucket, (an iron bottom preferred). It should be made a little heaviest in the back part, and a stop in front of the bail to prevent it tilting back, and it will come out of the water without canting. The bucket is emptied by a tilter formed and arranged substantially as shown at *g y*, Fig. 1, hung on pivots at the upper ends; and as the bucket comes up it is caught in the hook *y* of the tilter, pushed forward against the spout, and as the back part rises the front part of the bucket is prevented from rising by the upper curves of the hook *y* until it is pinched between the point of the hook *y* and the spout. Then it turns as if hinged on the edge of the delivery-spout, as shown by the dotted lines, and is held there while emptying. The stops *h h* keep the tilter from going too far either way.

What I claim as my invention, and desire to secure by Letters Patent of the United States, is—

1. The toothed wheel open and adapted to the chain, substantially as shown and described.

2. The said wheel, in combination with the chain *c b b f f d d*, substantially as shown and described.

3. The tilter *g y*, in combination with the flat chain *c b b f f d d*, substantially as shown and described.

4. The arrangement of the curved tilter *g y* and stops *h h*, substantially as shown and described.

W. B. WADSWORTH.

Witnesses:
JNO. D. PATTEN,
JOE H. SYPHERD.